United States Patent
Pialot, Jr.

(10) Patent No.: US 9,688,039 B2
(45) Date of Patent: Jun. 27, 2017

(54) METHOD FOR PRODUCING A FLEXIBLE WALL IN A GROOVE OF A TREAD FOR A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (FR)

(72) Inventor: Frederic Pialot, Jr., Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(*) Notice: Subject to any disclaimer, the term of this patent is extended or adjusted under 35 U.S.C. 154(b) by 218 days.

(21) Appl. No.: 14/403,317

(22) PCT Filed: May 15, 2013

(86) PCT No.: PCT/EP2013/060082
§ 371 (c)(1),
(2) Date: Nov. 24, 2014

(87) PCT Pub. No.: WO2013/178473
PCT Pub. Date: Dec. 5, 2013

(65) Prior Publication Data
US 2015/0174842 A1    Jun. 25, 2015

(30) Foreign Application Priority Data
May 31, 2012  (FR) ...................................... 12 55038

(51) Int. Cl.
*B60C 25/00*  (2006.01)
*B29D 30/68*  (2006.01)
(Continued)

(52) U.S. Cl.
CPC ............. *B29D 30/68* (2013.01); *B29D 30/52* (2013.01); *B29D 30/66* (2013.01)

(58) Field of Classification Search
CPC ...................................................... B60C 25/00
(Continued)

(56) References Cited

U.S. PATENT DOCUMENTS 5,800,642 A     9/1998  Ohya
6,655,438 B2 *  12/2003  Trochon ................. B24B 5/366
                                                              157/13
(Continued)

FOREIGN PATENT DOCUMENTS

FR     2715891 A1 *  8/1995  ............. B60C 11/03
FR     2946915       12/2010
(Continued)

OTHER PUBLICATIONS

JP 20020144070 20020520—Machine Translation of JP 2003335109A, Akasaka, Shuichi.*
(Continued)

*Primary Examiner* — Joseph S Del Sole
*Assistant Examiner* — Cedrick Williams
(74) *Attorney, Agent, or Firm* — Dickinson Wright PLLC (57) ABSTRACT

The tire has a tread with a tread surface and at least one groove which has a bottom wall and two lateral walls. At least one flexible wall is arranged in the groove in such a way that as liquid flows, the flexible wall flexes to allow the liquid to pass. After molding, the tire has a connecting element with a thickness which is equal to that of the bottom wall so that, after vulcanizing, the connecting element connects the lateral walls to the bottom wall over a given depth. The connecting element is then cut at its junction with each of the lateral walls of the groove so as to obtain the flexible wall.

15 Claims, 5 Drawing Sheets

(51) Int. Cl.
*B29D 30/52* (2006.01)
*B29D 30/66* (2006.01)

(58) Field of Classification Search
USPC .......................................................... 157/13
See application file for complete search history.

(56) References Cited

U.S. PATENT DOCUMENTS

| | | | |
|---|---|---|---|
| 7,213,625 B2* | 5/2007 | Martin | B60C 11/032 |
| | | | 152/209.17 |
| 8,950,453 B2* | 2/2015 | Tanno | B60C 11/032 |
| | | | 152/209.17 |
| 2004/0016491 A1 | 1/2004 | Martin | |
| 2008/0078487 A1* | 4/2008 | Ohara | B29D 30/0606 |
| | | | 152/209.19 |
| 2011/0259493 A1 | 10/2011 | Dautrey | |
| 2012/0114777 A1 | 5/2012 | Villeneuve et al. | |
| 2013/0014872 A1* | 1/2013 | Dautrey | B60C 11/0309 |
| | | | 152/209.18 |
| 2014/0048190 A1* | 2/2014 | Parfondry | B60C 11/13 |
| | | | 152/209.19 |

FOREIGN PATENT DOCUMENTS

| | | | | |
|---|---|---|---|---|
| FR | WO 2012/150948 | * | 4/2011 | ............. B29C 65/08 |
| FR | WO 2011/089107 A2 | * | 7/2011 | ............. B60C 11/04 |
| GB | 2450723 | | 7/2009 | |
| JP | 2003335109 A | * | 11/2003 | |
| JP | 2007210569 | | 8/2007 | |
| WO | 2010063749 | | 6/2010 | |

OTHER PUBLICATIONS

FR2715891A1 spec—Machine Translation of FR 2715891A1, Andreas Spielvogel.*
International Search Report for PCT/EP2013/060082 Dated Aug. 30, 2013.

* cited by examiner

METHOD FOR PRODUCING A FLEXIBLE WALL IN A GROOVE OF A TREAD FOR A TIRE

This application is a 371 national phase entry of PCT/EP2013060082, filed 15 May 2013, which claims benefit of French Patent Application No. 1255038, filed 31 May 2012, the entire contents of which are incorporated herein by reference for all purposes.

BACKGROUND

1. Field

The disclosure relates to the field of tire manufacture, particularly that of the manufacture of treads for tires.

More particularly, the disclosure is concerned with the manufacture of the flexible walls placed in a groove of a tire tread pattern.

2. Description of Related Art

The grooves in the tread pattern are there to drain and remove water when the tire is running over wet or soaking ground. These grooves cause some of the running noise phenomena insofar as they constitute zones in which air builds up under pressure generating sound waves. The grooves are arranged in the circumferential direction and in the axial direction, and their layout, dimension and number have been studied in detail by tire tread pattern designers.

In order to reduce the level of tire running noise, while at the same time maintaining the water clearance qualities, it is known practice in the art to position thin flexible walls in a direction transverse to the direction of the grooves. These walls, also known as flexible membranes or flaps, extend transversely from one of the walls of the groove and have the specific feature of maintaining their initial shape closing the groove when the tire is running on dry ground in order to block the spread of sound waves, and of being able to flex and thus open the groove when the tire is running on wet ground, in order to allow water entering the drainage groove to be removed.

Publications FR 2 715 891, GB 2 450 723 or even EP 908 330 describe various embodiments of these flexible walls.

It has been found that the most common forms of embodiment are flexible flaps or walls extending from the bottom wall of the groove, because of the absence of undercuts that oppose the demolding of the tire after the vulcanizing step. The wall of the flap has one or more radial slits allowing the said flap to pivot about its point of attachment to the wall of the groove as the flap passes from an open position to a closed position. The thickness of such flexible walls or flaps varies between 0.2 mm and 2 mm for a tire fitted to passenger cars.

In practice, the molds intended for molding the tires comprising such flexible flaps comprise closed cavities having the shape and dimensions of the flaps which cavities are made within the molding ribs intended to mold the drainage grooves.

However, creating these cavities with the required degree of precision comes with a great many difficulties, particularly when use is made of mold production techniques involving pouring molten material over an expendable mold, generally made of plaster, and in which the slenderness of the elements makes the latter excessively fragile.

A solution proposed in document FR-2946915-A1, consists in creating inserts comprising cutting reservations positioned at right angles to the direction of the groove and arranged within the molding ribs of the liner elements. Although these work satisfactorily, it has nevertheless been found that it was difficult to obtain, by molding, small thickness flexible flaps separated from the lateral wall of the groove by slits even finer than the thickness of these flaps, this being mainly because of problems of getting the rubber to flow into very narrow gaps. Moreover, demolding flexible flaps with inclined walls proves difficult and carries the risk of tearing the flaps. What is more, as the slits are separated from the lateral wall of the groove by a distance generally of between 0.1 and 0.2 mm, the tolerances imposed on the manufacture and fitting of the said inserts prove to be highly restrictive.

SUMMARY

The objects of embodiments of the invention are to overcome at least some of these disadvantages and to propose an improved method of manufacturing flexible walls for tires and means for implementing this method enabling good-quality flexible walls to be obtained economically.

These objects are achieved by way of a method of manufacturing a tread of a tire made of rubber compound, the said tread comprising a tread surface, at least one groove having a bottom wall and two lateral walls extending from the bottom wall towards the tread surface, and at least one flexible wall arranged in the said groove in such a way as to be able to flex as liquid flows, the said method comprising the following steps:

- molding the tread with at least one groove and at least one connecting element of a thickness equal to that of the said wall which element is arranged inside the said groove transversely to the longitudinal axis thereof, so that, after vulcanizing, the said connecting element connects the said lateral walls to the said bottom wall over a given depth from the latter;
- cutting the said connecting element at its junction with each of the lateral walls of the said groove so as to obtain the said flexible wall.

In this way it is possible easily to produce the said connecting elements in a first step of manufacture by molding and curing the tread and then, during a second stage of manufacture, cutting the side walls thereof, using suitable means, without having to suffer the abovementioned disadvantages. Specifically, it is easier to mold several connecting elements attached to the grooves at the same time as these grooves are being molded, and then to detach the connections at the sides that connect them to the lateral walls of the grooves. That offers the advantage of being able to use a mold that is simpler to produce and more robust, of making molding easier and of obtaining flexible walls of well-defined shape, without tears, and thus suited to closing off the groove on dry ground well and flexing well around their base on wet ground. This method lends itself even better to the creation of such flexible walls in grooves that have lateral walls that are inclined with respect to the base of the grooves, because separation of the connecting elements at the junctions with the lateral walls of the grooves can be performed only using a connection cutting step, because separating at the time of demolding carries the risk of tearing the flexible wall thus obtained.

For preference, the said cutting is performed using a cutting tool resting against the lateral wall of the said groove. Such a cutting tool rests against the lateral wall of the groove, which is more solid and therefore more rigid than that of the connecting element, allowing the groove to be opened well at the side, while at the same time obtaining a clean cut at the edges of the flexible wall thus produced.

Advantageously, the said cutting tool is secured to a guide device providing guidance along the said lateral wall. This allows the cutting tool to be positioned rapidly before and during the cutting of the junction of the connecting element, and for all the elements of one and the same groove.

For preference, the said cutting tool is a cutting knife. That allows the connections between the connecting element and the lateral walls of the groove to be cut without the removal of the material thus obtaining better closure of the groove on dry ground, for better effectiveness at attenuating running noise.

In an alternative form of embodiment of the invention, the said cutting tool is a hot knife. Such a knife is heated by a Joule effect when powered with electricity and allows the rubber connections that connect the flexible wall to the lateral walls of the groove to be cut more quickly.

In another alternative form of embodiment of the invention, the said cutting tool is a profiled tool. That allows the junctions of the flexible walls obtained to be cut to a given profile, generally that of the lateral walls of the groove.

In yet another alternative form of embodiment of the invention, the said cutting tool is a rotary circular blade. Such a rotary circular blade allows the junctions of the said connecting elements to be cut more rapidly.

For preference, the said rotary circular blade is driven in rotation at a speed of between 5000 and 30000 rpm.

Advantageously, the said groove is circumferential and the method comprises an additional step of mounting the tire comprising the said tread on a device that rotates the said tire. Such rotation, with the rotated tire preferably being inflated beforehand in order to give it greater rigidity, means that the connecting elements can be brought past the cutting tool quickly and addresses the problem of increasing productivity. For preference the rotational speed of the tire is between 0.1 and 10 rpm.

In yet another alternative form of embodiment of the invention the said cutting is performed using a laser cutting device. Such a laser cutting device uses a focused laser beam moved along a tangent to the lateral wall at the junction of the connecting element with this wall. This device has the advantage that the focal point can be positioned and controlled easily in order to obtain high quality cutting.

In an additional alternative form of embodiment of the invention, the said cutting is performed using a water jet cutting device. Such a cutting device allows clean and high-quality cuts to be made quickly when the line along which the water jet is focused is steered so that it can follow as closely as possible the tangent to the lateral wall of the groove and to the bottom wall of the groove.

Advantageously, the connections of one connecting element to the lateral walls of the said groove are cut together. Thus, because of the rigidity of the lateral walls of the groove, two cutting tools can operate simultaneously, making it possible to save time and obtain a flexible wall with good-quality cut edges.

For preference, the slit obtained after cutting has a thickness less than 0.5 mm and preferably less than 0.2 mm. The thickness of the slit separating the edges of the flexible wall from the lateral walls of the groove is very thin, if not to say zero when using cutting tools, allowing the groove to be closed well by the flexible wall thus obtained.

Advantageously, the width (e) of the said flexible wall is between 0.2 and 2 mm. Such a flexible wall makes it possible to obtain good attenuation of the running noise of a passenger car tire.

The objects of embodiments of the invention are also achieved using a tire mold for implementing the method of the invention, the said mold comprising at least one liner element which comprises a base and at least one molding rib, the said molding rib being interrupted by a transverse notch of a thickness substantially equal to that of the said connecting element, the said notch passing right through the said molding rib, the mold being characterized in that it comprises at least two adjacent liner elements each one comprising a base and at least one molding rib, at least one of the molding ribs of the first liner element having a width less than that of its base so as to form the said transverse notch between one of the external lateral faces of the said molding rib and the external lateral face opposite it belonging to the molding rib of the second liner element.

Such a mold offers the advantage of being easy to manufacture, notably by making a notch right across the molding rib of a liner element (a molding rib means a raised part of the mold used for molding the groove in the tread), the notch extending all the way down to the base of the rib.

In addition, by placing such a notch between two adjacent liner elements, the connecting elements of the invention can be produced advantageously by molding, such a connecting element being obtained at the junction between two liner elements by altering the width of the molding rib of just one liner element or that of the molding ribs of the two adjacent liner elements. That means that such a mold can be produced even more quickly, at a more advantageous cost, while at the same time the molding ribs can have less light manufacturing tolerances on their width.

BRIEF DESCRIPTION OF DRAWINGS

The description which follows is supported by FIGS. 1 to 9b in which.

DETAILED DESCRIPTION OF SPECIFIC EMBODIMENTS

Figure 1:
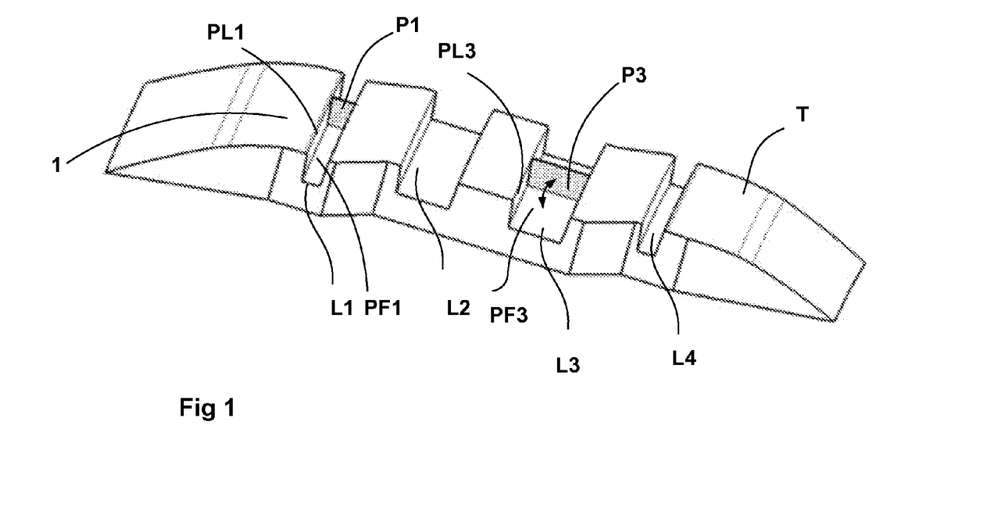
FIG. 1 depicts a partial schematic view of a tire comprising flexible walls arranged in circumferential grooves.

The portion of tire T depicted in FIG. 1 comprises a plurality of grooves L1, L2, L3 and L4 running in the circumferential direction of the tread. By way of example, two of these grooves L1 and L3 are equipped with flexible walls P1, P3. These walls are securely articulated to the bottom wall PF1, PF3 of the groove L1, L3 and incline alternatively about this connection in the directions indicated by the double-headed arrow featured above the flexible wall P3 of the groove L3. The flexible walls P1, P3 extend from the bottom of the groove L1 or L3 as far as the tread surface 1 and therefore have a height equal to that of the groove L1, L3 (although, in an alternative form, a flexible wall of a height less than that of the groove could be considered).

Figure 2A:
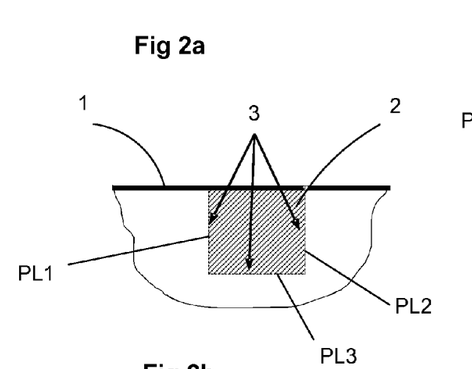
FIGS. 2a, 2b (2a is a view in cross section and 2b a view from above) and FIG. 3 (view in cross section) illustrate steps in the manufacture of the flexible wall according to an embodiment of the invention.
Figure 2B:
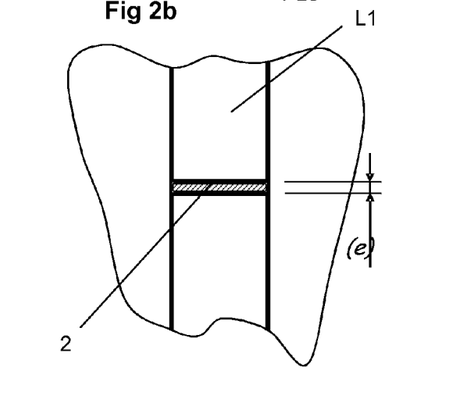

FIGS. 2a and 2b illustrate a groove L1 comprising a connecting element 2 of thickness (e) obtained by molding at the same time as the groove L1. The connecting element 2 is arranged transversely to the longitudinal axis of the groove L1 and has junctions 3 with each of the lateral walls PL1, PL2 and with the bottom wall PL3 of the groove L1.

Figure 3:
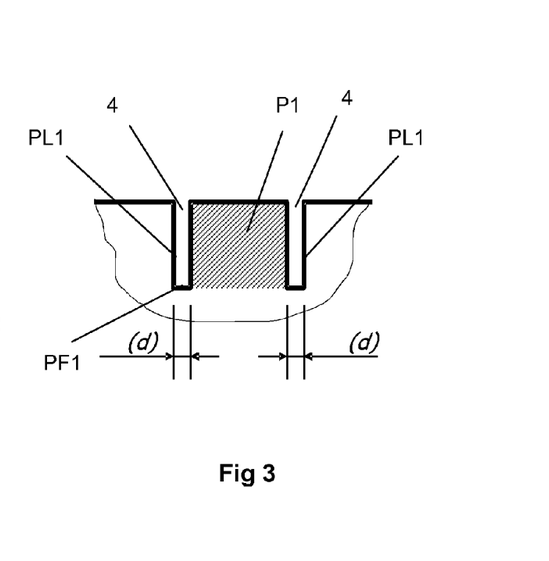

FIG. 3 illustrates a flexible wall P1 obtained after cutting the connecting element 2 of the preceding figures at the junctions 3 that connect it to the lateral walls PL1. A flexible wall P1 is thus separated from the lateral walls PL1 by two notches 4 while at the same time being connected by its base to the bottom wall PF1 of the groove L1. The notches are of small depth (d), ranging potentially from 0 to 0.5 mm depending on the cutting tool used and they extend as far as the bottom wall PF1. During operation, the flexible wall thus obtained remains in the vertical initial position (as visible in FIG. 3) on dry ground and closes the groove and, as the tire runs over wet ground, it flexes about its base to open the groove and allow the water to be discharged therefrom.

Figure 4:
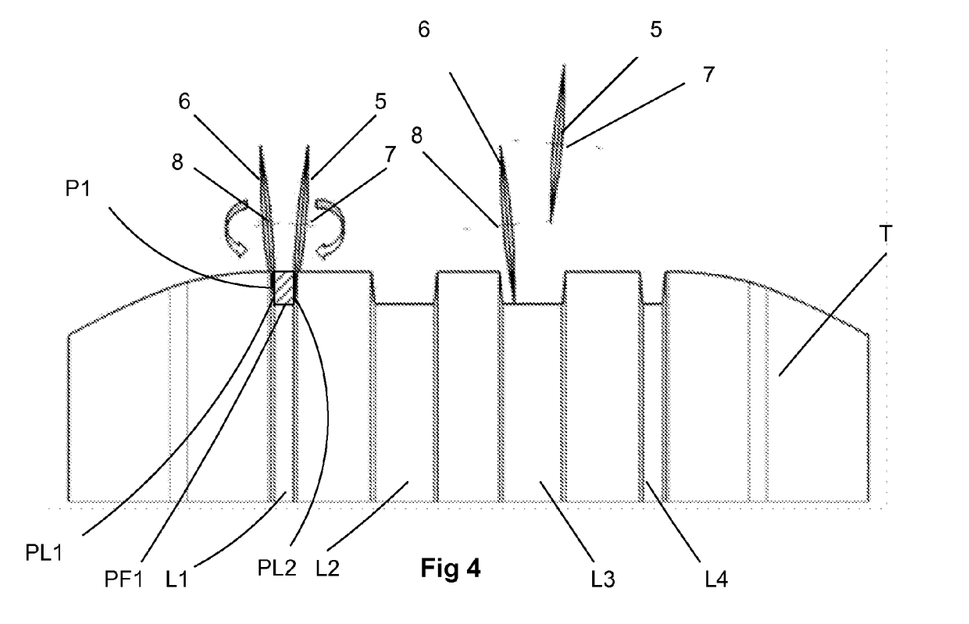
FIG. 4 illustrates one example of the positioning of a cutting tool with respect to the tread of a tire during the manufacture of a flexible wall according to an embodiment of the invention.

FIG. 4 illustrates one exemplary embodiment and example of positioning of the tools for cutting the junctions with the lateral walls of the connecting elements 2 within a tire T. In this example, the cutting tools 5, 6 are circular blades comprising rotational-drive means (not depicted) for rotating them about their central axis 7, 8. The rotary circular blades 5, 6 have a radius greater than the depth of the groove and are positioned in such a way as to make a cut in a direction tangential to the lateral wall of the said groove, their cutter resting against the lateral wall PL1 of the groove L1, while at the same time taking care not to cut into the bottom wall of the groove.

The tools illustrated in the region of the groove L3 of FIG. 4 are depicted in a position approaching for cutting, one of them above the groove in an inclined position so that its cutting edge is parallel to the lateral wall of the groove and the other in a position lowered into the bottom of the groove. The same cutting tools 5, 6 are depicted in the working position in the groove L1.

When the grooves L1 to L4 are circumferential, the tire T is advantageously rotated about its central axis, being mounted on a device which at the same time can be used to inflate it for greater rigidity. By way of example, the tire may revolve at a speed of between 0.1 and 10 rpm and the circular blades at a speed of between 5000 and 30000 rpm.

Figure 6:
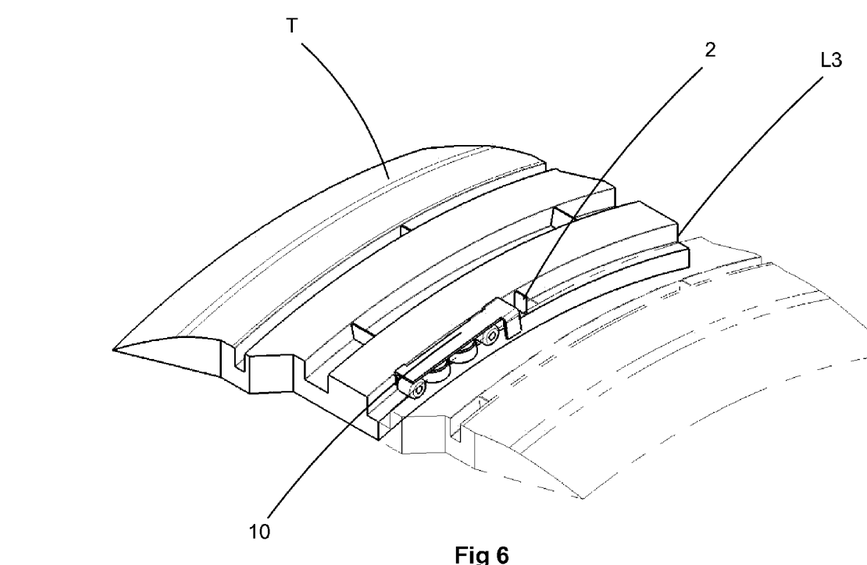
FIG. 6 is a partial schematic view of a tire comprising a cutting device placed in one of its grooves so as to cut a flexible wall.

FIG. 6 illustrates another embodiment of the flexible walls according to the invention, in which a cutting device 10 is arranged in the groove L3 of a portion of tire T. The cutting device 10 is more clearly visible in FIG. 7 and comprises a frame 11 of a width less than that of the groove L3 so that it can move along inside the latter. The frame 11 comprises, near its top, a spacer 13 parallel to the bottom wall of the groove L3. The spacer 13 supports two knives 12 at its forward end, followed by two push rollers 15 for pushing the cutting device 10 along inside the groove L3, these flanking two guide rollers 14. The cutting device 10 can be moved along in the grooves of a stationary tire or, as in the previous example, moved along inside the grooves of a tire that is rotated and, preferably, inflated.

The knives 12 project towards the bottom of the groove from the spacer 13 and are arranged in such a way that their cutting edge 12a is parallel to the lateral wall of the groove. The knives 12 have a cross section 12s of triangular shape (as illustrated in the lower part of the knife of FIG. 7), the point being directed forwards as viewed in the direction in which the cutting device 10 travels along the groove.

Figure 7:
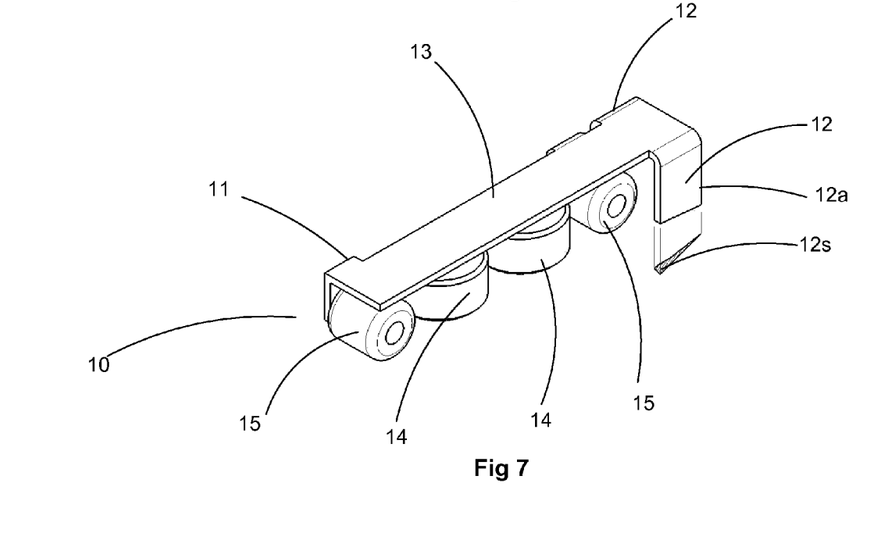
FIG. 7 is a perspective view of a cutting device of FIG. 6.

Each guide roller 14 is mounted and rotates freely about its vertical axis, which is perpendicular to the plane of the spacer 13, when it comes into contact with a lateral wall of the groove and thus guides the knives 12 with respect to the wall. The diameter of the rollers 14 and the positioning thereof are chosen so that each roller can rotate freely about its axis upon contact with the wall. Elastic compensation systems may also be provided in order to push the rollers into contact with the lateral walls or wall as the device moves along the groove.

The cutting device 11 moreover comprises pushing rollers 15 each of which rotates freely about an axis parallel to the plane of the spacer 13. The pushing rollers 15 press against the bottom of the groove and allow the cutting device 10 to be moved along and the flexible walls to be pushed over towards the bottom of the groove once the junctions with the lateral walls have been cut.

In an alternative form of embodiment of the cutting device 10, the cutting knives 12 are replaced by heated knives (not depicted in the drawings) which produce heat through a Joule effect by being connected to a source supplying electrical power and which are regulated by a thermostat. The heated parts are then blades of constant cross section having a thickness of around 0.5 mm, which are made of a resistive material or are resistive wires with a diameter of approximately 0.5 mm.

Figure 8A:
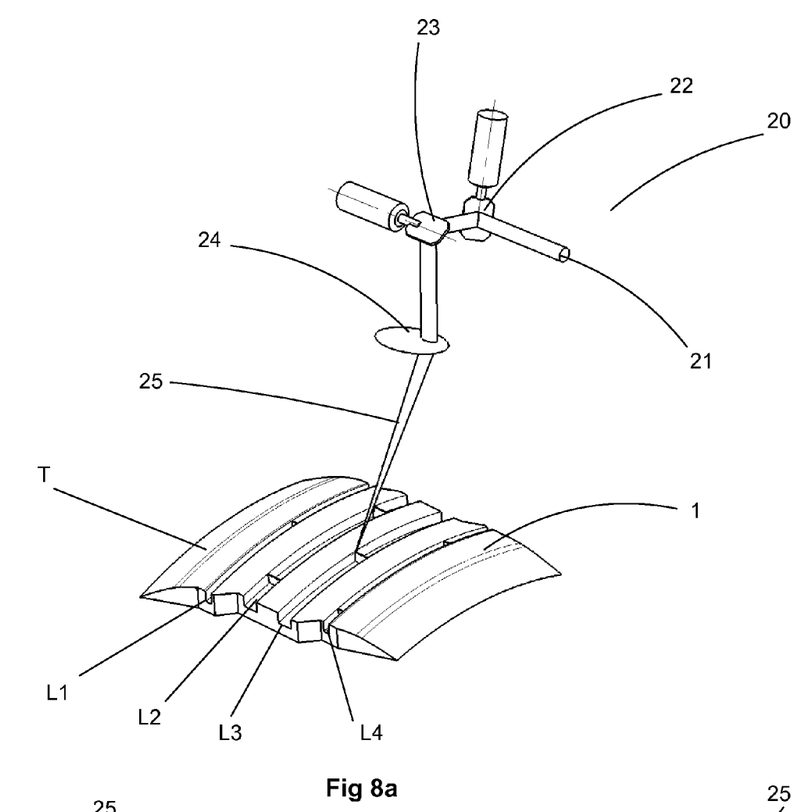
FIG. 8a depicts a schematic perspective view of a tire and of a laser beam cutting device.
Figure 8B:
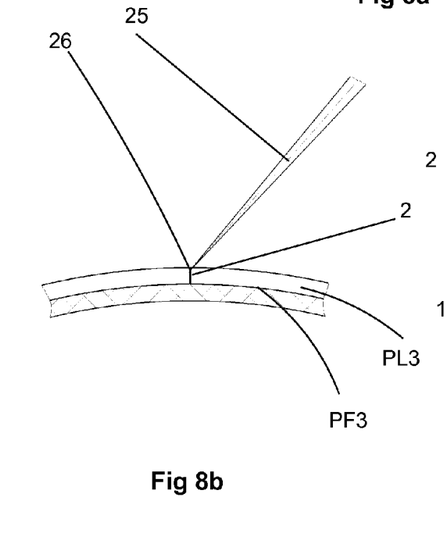
FIGS. 8b and 8c depict the cutting of the flexible wall by the laser beam viewed in radial section and viewed in perspective.
Figure 8C:
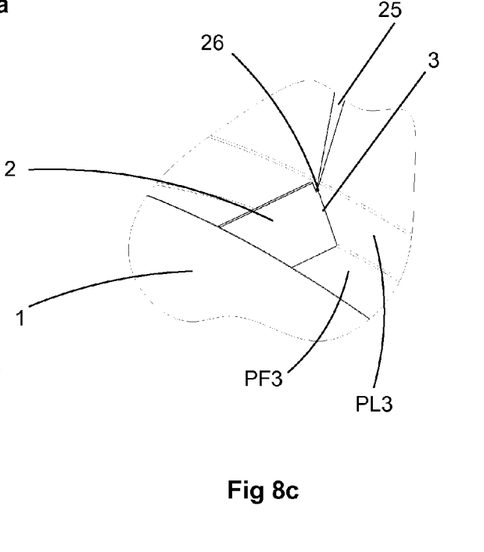

In another exemplary embodiment of the invention and as is better visible in FIGS. 8a to 8c, the junctions 3 of the connecting elements 2 to the lateral walls PL3 are cut using a laser cutting device 20. Such a device comprises a laser source (not depicted in the drawings) which sends an unfocused laser beam 21 towards a first galvanometric mirror 22. The mirror 22 redirects the received beam towards a second galvanometric mirror 23 which transmits it to a focusing lens 24. The diameter of the incident beam and the setting of the focal length determine the thickness of the resultant slit after the cutting of the junctions 3 of the connecting element 2, the width (d) (shown in FIG. 3) of this slit being around 0.1 mm. The laser beam cutting device 20 also comprises a control unit (of the three-dimensional numerical control type) which, after referencing, allows the focal point 26 of the focused laser beam 25 to be steered along the junction 3 of the connecting element 2 with the lateral wall PL3 of the groove L3. The laser beam 25 is guided tangentially along the lateral wall PL3 and is inclined (at an acute angle) to the plane of the bottom wall of the groove L3. Thus, by selecting the focal distance in such a way that the focal point lies at the junction 3 that is to be cut, and by accurately steering the focal point 26 of the laser beam 25 along the lateral wall PL3 of the groove, a precise, clean and quick cutting of the junctions 3, and therefore a flexible wall of exact dimensions, are obtained.

Figures 9A, 9B:
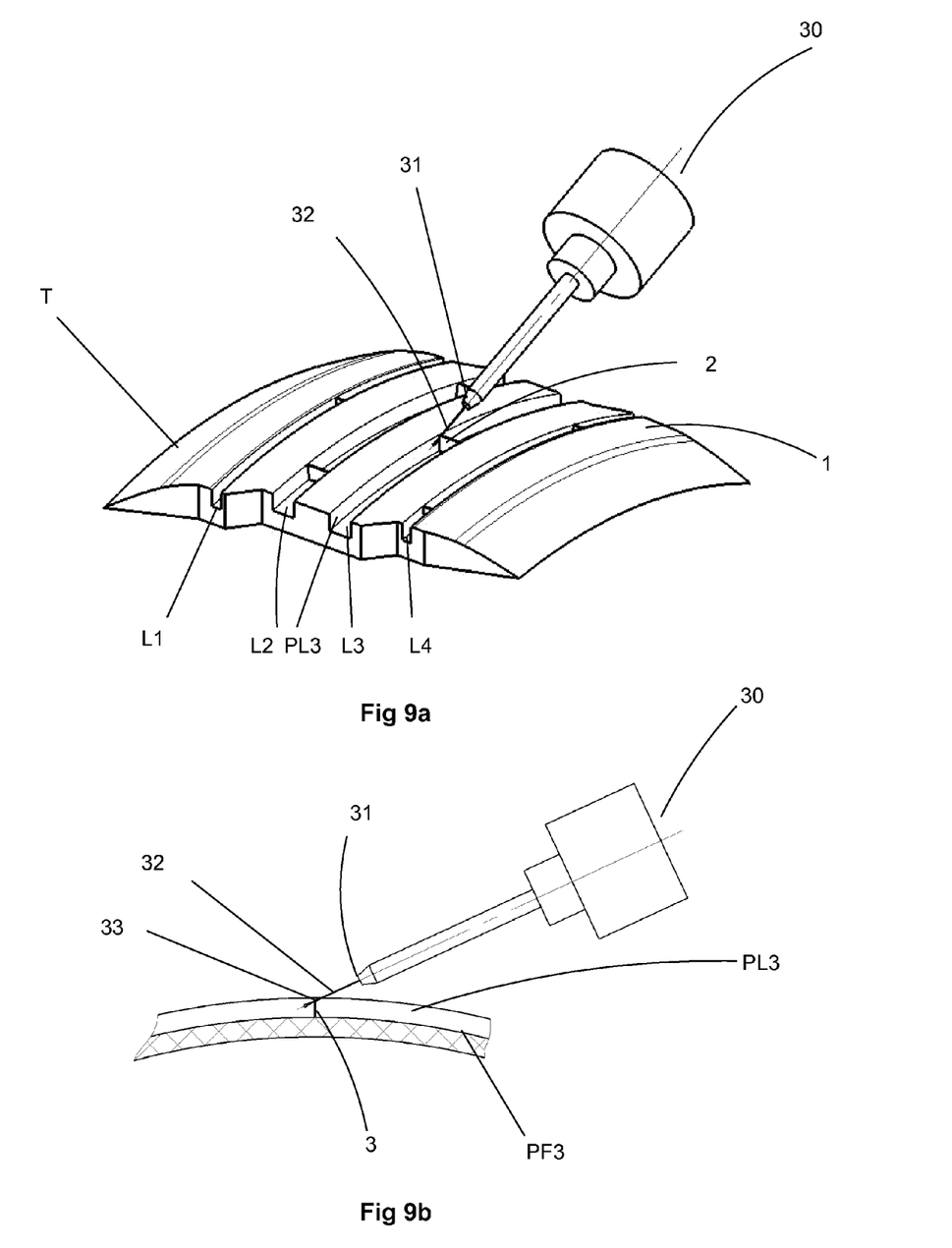
FIG. 9a depicts a schematic perspective view of a tire and of a water jet cutting device.
FIG. 9b is a view in radial section showing the position of the water jet with respect to the flexible wall.

In another exemplary embodiment of the invention and as better visible in FIGS. 9a and 9b, the junctions 3 of the connecting elements 2 with the lateral walls PL3 are cut using a water jet cutting device 30. The path followed by the focal line 33 of the water jet 32 can be programmed in three dimensions along the junction 3 that is to be cut. The focal line 33 of the water jet 32 is guided along the lateral wall PL3 in a direction as close as possible to the tangent to the lateral wall and along the tangent to the bottom wall of the groove. The water jet cutting device 30 comprises a focusing nozzle 31 with a small diameter, for example less than 0.2 mm, which is situated as close as possible to the junction that is to be cut. Controlling the pressure of the water jet 32, the diameter of the nozzle and the path of the focal line 33 makes it possible to obtain precise and rapid cutting of the junctions 3, without notches or cuts into nearby zones. Thus, as is best visible in FIG. 9b, the focal line of the water jet is such that on leaving the cutting zone, the water jet is defocused and out of the material so as to limit its cutting action to the junction 3 and prevent the cutting of the nearby zones. For large-diameter nozzles for which it is difficult to achieve the ideal orientation with respect to the wall, and in order to avoid nicking the bottom of the groove, cutting is stopped shortly before reaching the bottom wall of the groove. The water jet used does not contain any abrasive, the connecting element 2 being a rubber compound and its junctions with the lateral wall of the groove are easy to cut.

As in the preceding examples, the tire may be rotated and preferably inflated while the junctions 3 are being cut with the laser beam cutting device 20 or with the water jet cutting device 30.

Figure 5:
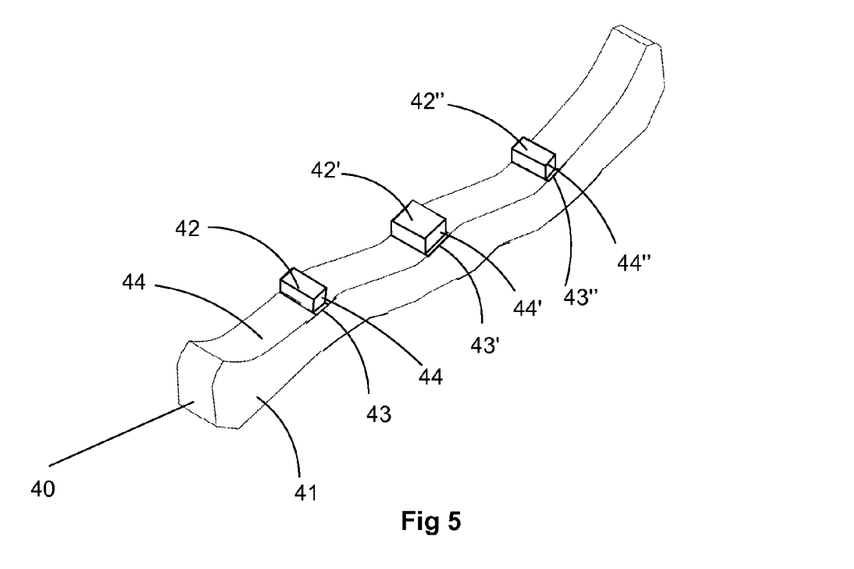
FIG. 5 illustrates a perspective view of one example of a liner element forming part of a tire mold used for implementing an embodiment of the invention.

FIG. 5 illustrates a liner element 40 forming part of a tire mold used for implementing the method of the invention. A number of liner elements are arranged circumferentially, positioned side by side, and are intended to form the molding cavity for the tire tread. The liner element 40 comprises a base 41 the upper surface 44 of which molds the tread surface 1 and from which there project a number of molding ribs 42, 42', 42". The molding ribs 42, 42', 42" allow the molding of the grooves, for example the grooves L1, L2, L3 of FIG. 1, within the tread. According to the invention, the molding ribs 42, 42' 42" are interrupted by a number of transverse notches 43, 43', 43" (it will be appreciated that these are perpendicular to the longitudinal direction of the molding ribs) at a predetermined point on the width of the said molding ribs. Such notches allow the molding of the connecting elements 3 in connection with the lateral walls of the grooves.

In the example illustrated in FIG. 5, the molding ribs 42, 42', 42" of the liner element 40 have a width less than that of its base 41 so as to form the said transverse notches 43, 43', 43" between one of the external lateral faces 44, 44', 44" of the said molding rib 42, 42', 42" and the external lateral face opposite it belonging to the molding rib of the adjacent liner element. In this way, the transverse notches 43, 43', 43" are advantageously produced at the end of the molding ribs 42, 42', 42" and assure the mounting of the liner elements within a mold while encompassing any clearance that there might be between the molding ribs of the two adjacent liner elements, this making it possible to prevent there being any flash after vulcanizing.

Other alternative forms and embodiments of the invention may be considered without departing from the scope of these claims.

The invention claimed is:

1. A method of manufacturing a tread of a tire made of rubber compound, comprising a tread surface, at least one groove having a bottom wall and two lateral walls extending from the bottom wall towards the tread surface, and at least one flexible wall arranged in the groove in such a way as to be able to flex as liquid flows, the method comprising:
    molding the tread with the at least one groove and at least one connecting element of a thickness equal to that of the lateral wall, wherein the at least one connecting element is arranged inside the at least one groove transversely to a longitudinal axis thereof, so that, after vulcanizing, the at least one connecting element connects the lateral walls to the bottom wall over a given depth from the latter; and
    cutting the connecting element at a junction thereof with each of the lateral walls of the at least one groove so as to obtain the flexible wall.

2. The method according to claim 1, wherein the cutting is performed using a cutting tool resting against the lateral wall of the at least one groove.

3. The method according to claim 2, wherein the cutting tool is secured to a guide device providing guidance along the lateral wall.

4. The method according to claim 2, wherein the cutting tool is a cutting knife.

5. The method according to claim 2, wherein the cutting tool is a hot knife.

6. The method according to claim 2, wherein the cutting tool is a profiled tool.

7. The method according to claim 2, wherein the cutting tool is a rotary circular blade.

8. The method according to claim 7, wherein the rotary circular blade is driven in rotation at a speed of between 5000 and 30000 rpm.

9. The method according to claim 1, wherein the groove is circumferential and further comprising mounting the tire comprising the tread on a device that rotates the tire.

10. The method according to claim 1, wherein the cutting is performed using a laser cutting device.

11. The method according to claim 1, wherein the cutting is performed using a water jet cutting device.

12. The method according to claim 1, wherein two junctions that connect one of the at least one connecting elements to the lateral walls of the at least one groove are cut together.

13. The method according to claim 1, wherein a slit obtained after cutting has a thickness less than 0.5 mm.

14. A tire mold for manufacturing a tread of a tire according to claim 1, comprising:
    at least one liner element which comprises a base, and
    at least one molding rib, wherein the molding rib is interrupted by a transverse notch of a thickness substantially equal to that of the at least one connecting element, wherein the notch passes right through the molding rib,
    wherein at least two adjacent liner elements each comprise a base and at least one molding rib, at least one of the molding ribs of a first liner element having a width less than that of its base so as to form the transverse notch between one of the external lateral faces (44, 44', 44") of the said molding rib, and wherein an external lateral face opposite it belongs to the molding rib of the second liner element.

15. The method according to claim 13, wherein the thickness of the slit after cutting is less than 0.2 mm.

* * * * *